July 31, 1934.　　　　L. M. FRANCIS　　　　1,968,196
SYSTEM FOR LOADING AND UNLOADING TRAILERS FROM RAILROAD CARS
Filed Dec. 3, 1931　　　4 Sheets-Sheet 1
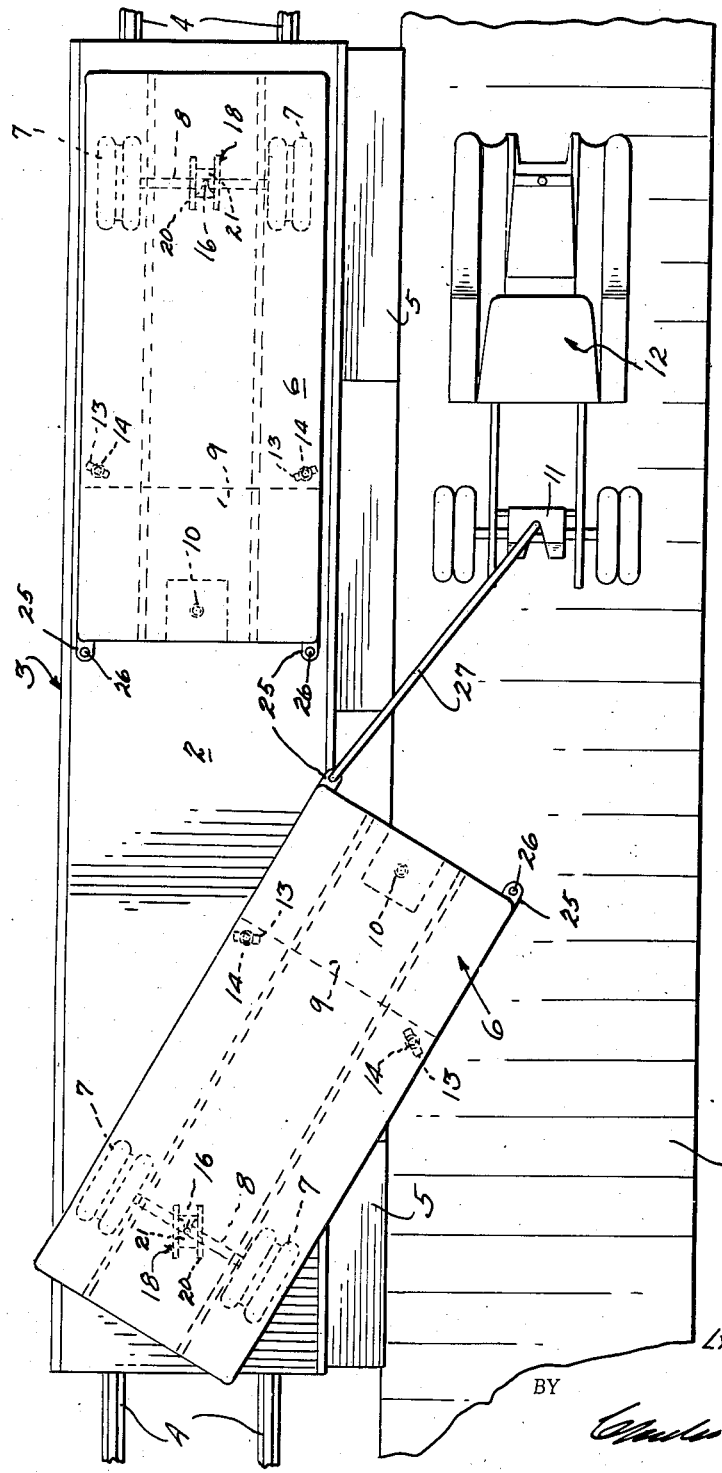
INVENTOR.
LYNN M. FRANCIS
BY
ATTORNEY.

July 31, 1934.   L. M. FRANCIS   1,968,196
SYSTEM FOR LOADING AND UNLOADING TRAILERS FROM RAILROAD CARS
Filed Dec. 3, 1931   4 Sheets-Sheet 2
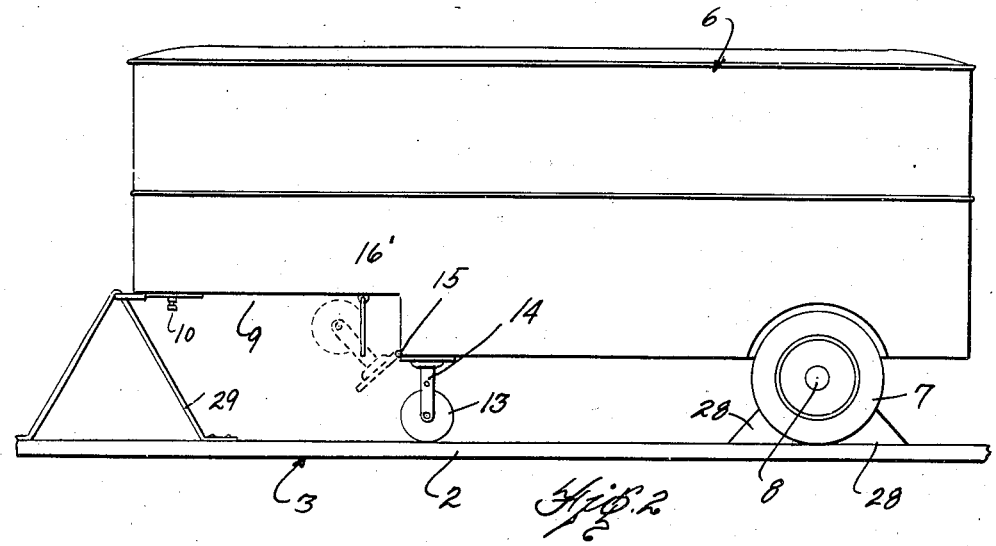
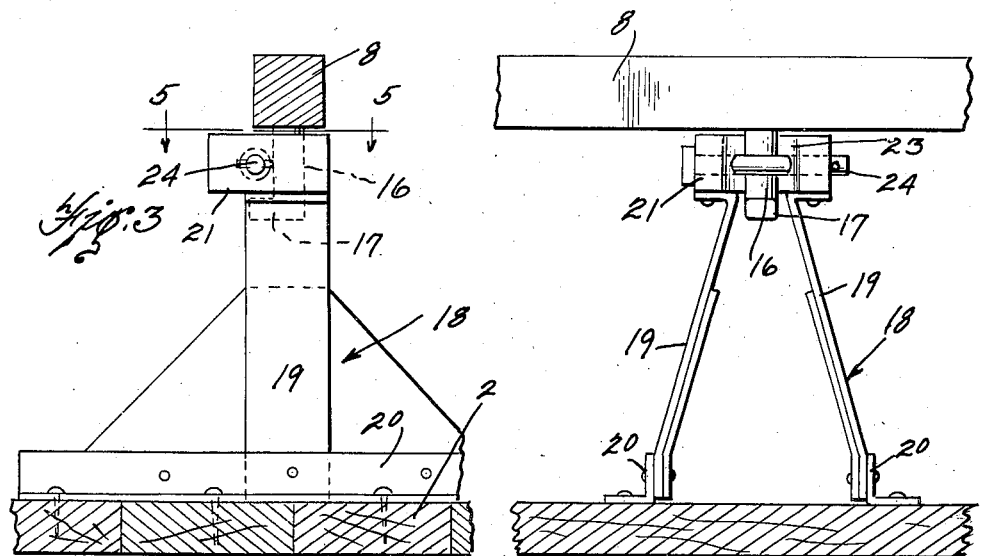
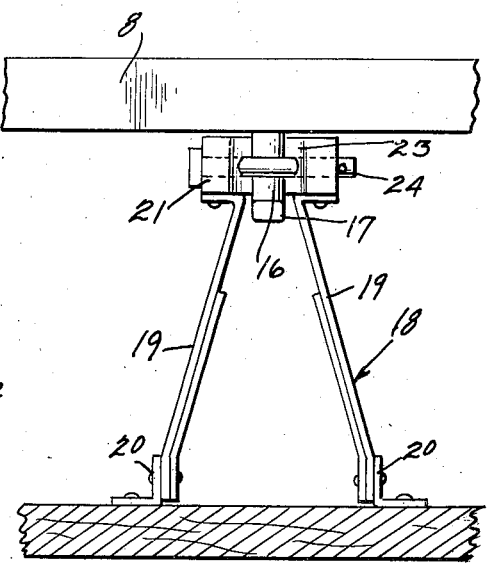
INVENTOR.
LYNN M. FRANCIS
BY
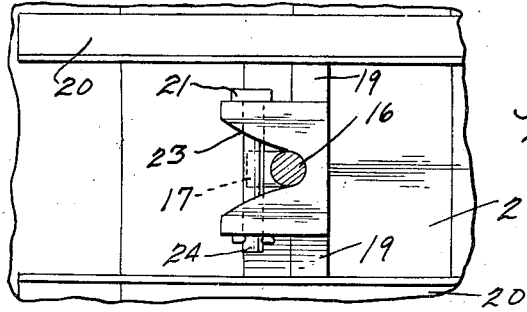
ATTORNEY.

July 31, 1934.   L. M. FRANCIS   1,968,196
SYSTEM FOR LOADING AND UNLOADING TRAILERS FROM RAILROAD CARS
Filed Dec. 3, 1931   4 Sheets-Sheet 3
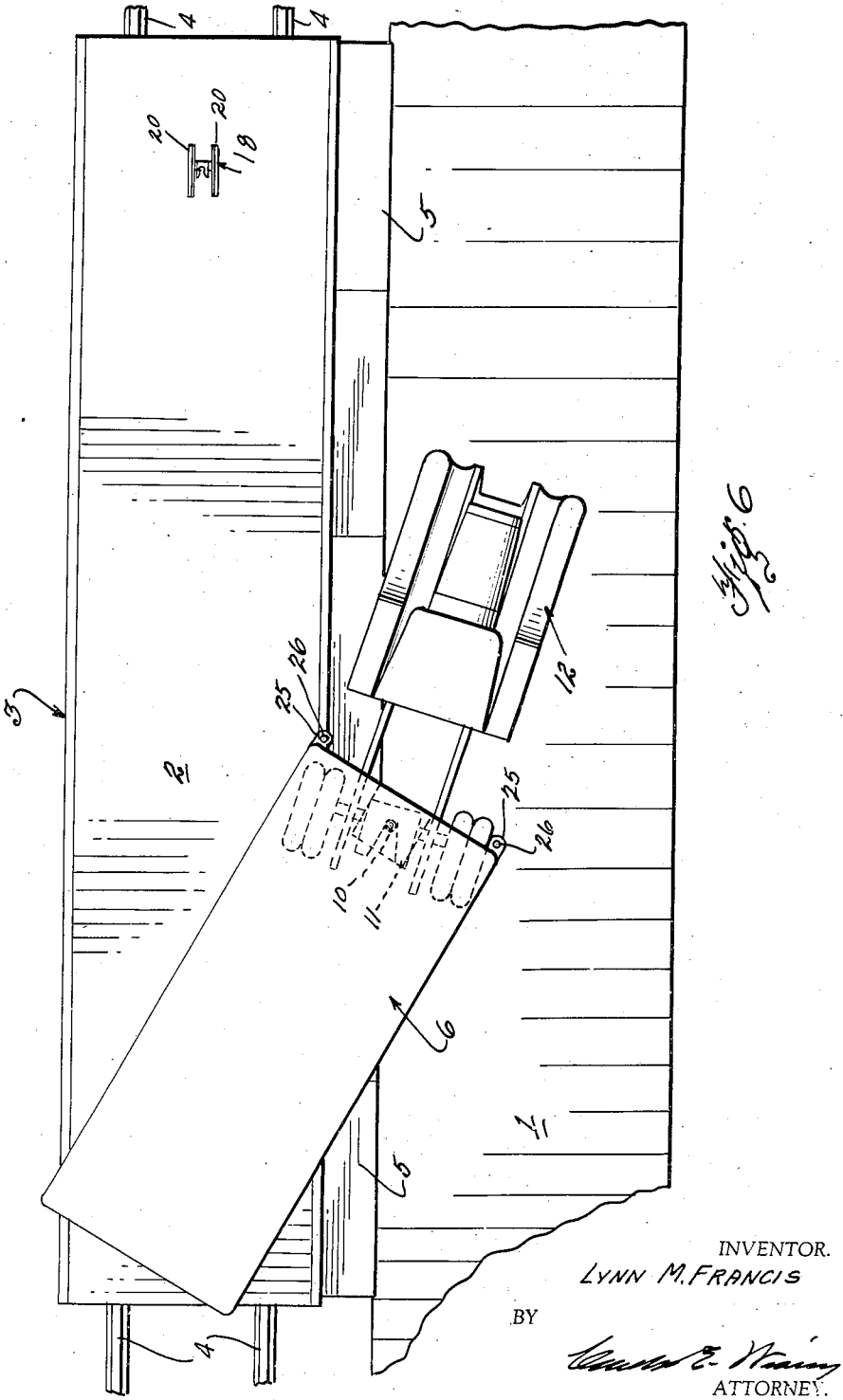
INVENTOR.
LYNN M. FRANCIS
BY
ATTORNEY.

July 31, 1934.   L. M. FRANCIS   1,968,196
SYSTEM FOR LOADING AND UNLOADING TRAILERS FROM RAILROAD CARS
Filed Dec. 3, 1931   4 Sheets-Sheet 4

INVENTOR.
LYNN M. FRANCIS
BY
ATTORNEY.

Patented July 31, 1934

1,968,196

UNITED STATES PATENT OFFICE 1,968,196

SYSTEM FOR LOADING AND UNLOADING TRAILERS FROM RAILROAD CARS

Lynn M. Francis, Detroit, Mich., assignor to Mechanical Handling Systems, Incorporated, Detroit, Mich., a corporation of Michigan Application December 3, 1931, Serial No. 578,736

5 Claims. (Cl. 214—38)

This invention relates to a system of loading loaded road vehicles onto or removing the same from railroad cars whereby the handling of goods in transportation is reduced to a minimum.

It has commonly been the practice to transport goods by means of automobiles and automobile trailers to a railroad car and transfer the goods from the automobile or trailer to the car and upon the car reaching its destination to then transfer the goods from the car to an automobile trailer for transportation to the point of delivery.

By my improved system and means, a loaded vehicle such as a trailer may be moved onto a railroad car and moved therefrom on its own wheels and thus avoids the considerable cost involved in the previously unnecessary handling of the goods as the goods once packed in the trailer are carried to their destination by the railroad and then removed from the railroad car for transportation to the point of delivery and the empty vehicle again returned either loaded or unloaded.

It is a purpose and object of the invention to provide means in combination with a railroad car and a trailer or other road vehicle whereby one or more highway trailers or vehicles may be quickly and easily loaded onto or unloaded from a railroad car and particularly consists in the provision of a means such for instance as a standard on the car and a cooperative device on the highway vehicle permitting the vehicle to be backed onto the car to engagement with the standard pivoted thereon while supported by its own wheels.

By my improved construction the vehicle may be backed by a truck for instance to which it may be coupled and the construction of the standard and complemental means is such that as the vehicle is backed onto the car the parts are guided to pivotal relationship and by pressure applied angularly to the longitudinal axis of the vehicle causes the rear end of the vehicle to pivot on its own wheels as a support to bring the same to the desired position on the car platform. By such arrangement the vehicle is easily swung to loading or unloading position and the loaded vehicle is then transported.

In this method of loading or unloading the vehicle to or from the car it is preferable that the wheels supporting the same and on which they turn in the pivoting movement are free to rotate on the supporting axial element and the opposite end of the vehicle may or may not be wheel supported as there are a number of trailer vehicles in which the forward end is supported on an automobile truck and in pivotal relation with the truck thus permitting the truck to back the trailer vehicle with the rear end to engagement with the pivotal support and the truck then turned to apply pressure at an angle to the support to cause the trailer vehicle to pivot on its wheels in the desired manner in loading or unloading the same.

The invention is not limited to the specific construction of the vehicle to be loaded or unloaded as even powered road vehicles such as a truck may be provided with an element for cooperative relation on the standard carried by the railroad car about which the rear end of the truck may pivot. The invention, however, is designed more particularly for the loading or unloading of highway trailer vehicles now commonly in use in conjunction with automobiles and trucks for transportation of goods and the word "trailer" as hereinafter used refers to such type of vehicle.

These objects and the several novel features of the invention are hereinafter more fully described and claimed, and the preferred form of construction by which these objects are attained is shown in the accompanying drawings in which—

Fig. 1 is a diagrammatic plan view showing the method of loading two trailers onto a railroad car.

Fig. 2 is a side elevational view of a trailer loaded on a railroad car.

Figs. 3 and 4 are detail views of the means for pivotally holding the axle of the trailer.

Fig. 5 is a section taken on line 5—5 of Fig. 3.

Fig. 6 is a diagrammatic plan view showing a trailer coupled with a truck, the rear end of the trailer pivotally connected to the standard on the railroad car.

Figure 7:
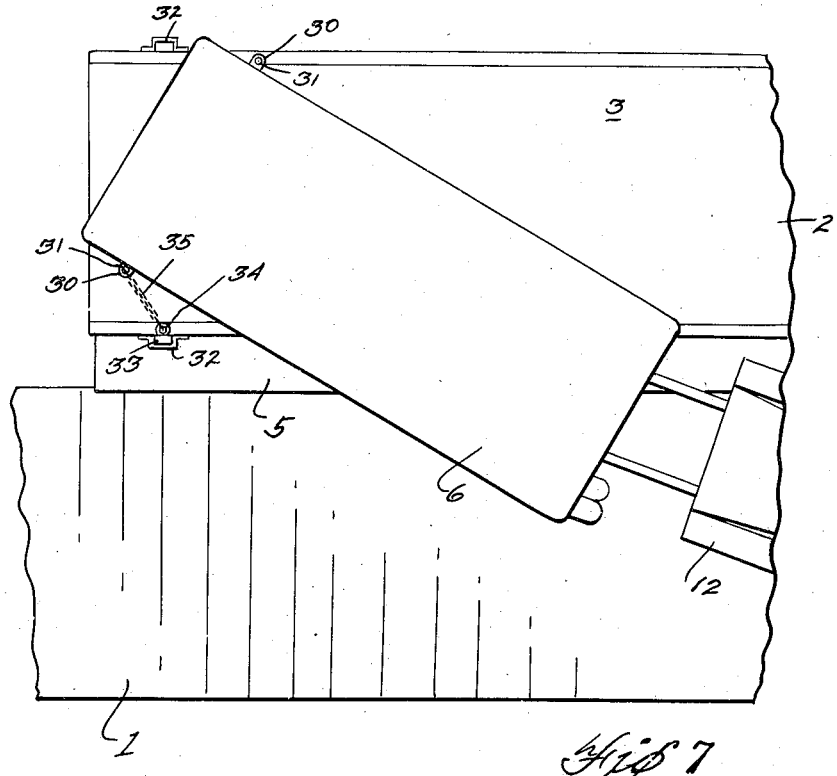
Fig. 7 is a view similar to Fig. 6 showing a modified form of means for holding the rear end of the trailer.

It is rapidly becoming the practice to transport loaded trailers on railroad cars thereby reducing the cost of handling the articles to be shipped as it is only necessary to load the trailer, preferably at some point remote to the loading platform where the cars are to be loaded, and then drive the trailer onto the platform and move the trailer onto a railroad car and then move the trailer from the car at its point of destination and again hook a truck to the trailer and move the same to any desired point for unloading the merchandise carried thereby. It will thus be seen that the cost of handling the goods to be transported is materially reduced and likewise the damage done in too much handling is eliminated and further the loading of a train of railroad cars will be materially expedited as the trailers may be placed on each car in a remarkably short period of time.

Referring to the drawings, the loading dock 1 is preferably made to align, in a horizontal plane, with the platform 2 of the railroad car 3, the same being of any desired well known construction and adapted to be pulled along the railroad tracks 4. A gang plank 5 closes the space between the edge of the dock and the railroad car to permit the trailer 6 to be rolled from the dock onto the railroad car or from the car onto the dock in a manner to be hereinafter described.

The trailer 6 is provided with the rear wheels 7 rotatably mounted upon the axle 8, the axle being rigidly connected to the bottom of the trailer in any desired manner. The bottom of the trailer adjacent the forward edge is offset at 9 and the bottom portion thereof is provided with the usual depending king pin 10 for permitting the forward edge of the trailer to be locked in the usual manner to the bifurcated plate 11 positioned on the rear of the truck or tractor 12. This construction is well known in the art and is believed need no further description as to its construction. A pair of supporting wheels 13 are rotatably mounted on the under side of the trailer 6 adjacent the offset portion 9, these wheels being so arranged as to be capable of turning or rotating about the vertical axis of the leg 14. The forward edge of the bracket for carrying the wheel 13 is hingedly connected at 15 to the bottom of the trailer and may be swung up to the position shown by dotted lines in Fig. 2 when the trailer is connected to the truck 6 to permit the trailer to be moved over the ground. It will, of course, be understood that the supporting wheels will be held in their raised position in any desired manner such as by the locking member 16'. The rear axle 8 of the trailer is provided centrally thereof with a depending pivot pin 16 having a horizontal extension 17 at its lower end.

The standard 18 comprises the legs 19, the lower edge of each leg being welded or otherwise secured to the angle irons 20 the same being suitably secured to the platform 2 of the railroad car 3. The upper end of each leg is suitably secured to the member 21 the forward edge of the same being provided with the notch 23 of a size to receive the pivot pin 16. A locking pin 24 extends through the solid portion of the member 21 and also through the recess 23 to lock the pin in place. It will thus be seen that since the lower end of the pin 16 is provided with the horizontal extension 17 the trailer cannot lift or be jolted out of the member 21. The forward edge of the trailer adjacent each side is provided with the bracket 25 having an aperture 26 for receiving one end of the draw bar 27, the opposite end of the draw bar being adapted to be locked in the bifurcated plate 11 when it is desired to swing a trailer onto or from a railroad car. When the trailer is in position on the car 3 the rear wheels 7 may be securely held by the wedge shaped blocks 28 and the forward end of the trailer may be held down by the tie rods or cables 29.

The system of loading the cars is as follows: The railroad car is first brought to a point adjacent the loading dock or platform and a gang plank placed to cover the opening between the edge of the car and the edge of the platform. A truck or tractor having a trailer connected thereto is moved onto the platform and the trailer backed up so that the pivot pin 16 is moved into the notch 23 in the member 21 and the locking pin 24 inserted through the member 21 to hold the locking pin in place as is shown in Fig. 6. The forward end of the trailer is then disconnected from the bifurcated plate 11 in the usual manner. The supporting wheels 13 will be moved to their lowermost position prior to disengaging the trailer from the truck so that as the truck is moved forward away from the trailer the weight of the forward end of the trailer will be supported by the wheels 13. One end of the draw bar 27 will then be inserted in one of the brackets 25 and the other end locked in the bifurcated plate 11 in a manner similar to that employed in locking the king pin of the trailer therein, this step of the operation being clearly shown in Fig. 1. It will thus be seen that as the truck 12 is backed up that the forward end of the trailer will be moved onto the car so that the trailer will be in a position longitudinally of the car 3 and as the rear end is pivotally supported in the standard 18 the rear wheels will traverse an arc about the pivot 16.

The supporting wheels 13 being swiveled to the bottom of the trailer will assume the position approximately as shown in Fig. 1 to permit the trailer to be easily swung about the pivot and the rear axle. A second trailer may be placed on the car 3 in a similar manner and it will be noted that it is necessary to provide very little space between the adjacent ends of the trailers. After the trailer has been placed in position on the car the draw bar 27 is disconnected from the trailer and the blocks 28 may be, if desired, positioned in front and to the rear of the wheels 7 and the tie rods or cables 29 inserted through each aperture 26 in the brackets 25 and the free ends suitably fastened to the car platform. When it is desired to unload the trailers the blocks 28 and the tie rods 29 are first removed and a truck or tractor moved onto the platform 1 and one end of the draw bar 27 is inserted in the bracket farthest from the platform and the opposite end is inserted in the bifurcated plate 11 and then by moving the truck forward the front end of the trailer will be swung to a position so that the king pin may be engaged by the bifurcated plate 11 after the draw bar 27 has been removed. When the forward end of the trailer has been connected in the usual manner to the rear end of the truck 12 the supporting wheels 13 will be swung up off of the ground and the locking pin 24 removed from the member 21 whereupon the truck and trailer may be driven from the platform 1 to any point where it is desired to unload the trailer.

Referring to Fig. 7 the trailer 6 is provided adjacent its rear end and on each side thereof with the brackets 30 each having an aperture 31 therein. The railroad car 3 is provided with the usual stake pockets 32 and a stake 33 is positioned in one of the pockets and is provided with the eye bolt 34. A chain or flexible member 35 has one end hooked in the aperture 30 in the bracket 31 and has its other end hooked in the eye bolt 34. It will thus be seen that the trailer may be backed into position on the railroad car in a manner heretofore described as the chain will hold the rear end of the trailer. It will, of course, be understood that the chain 35 may be hooked to any convenient place on the railroad car.

Figure 8:
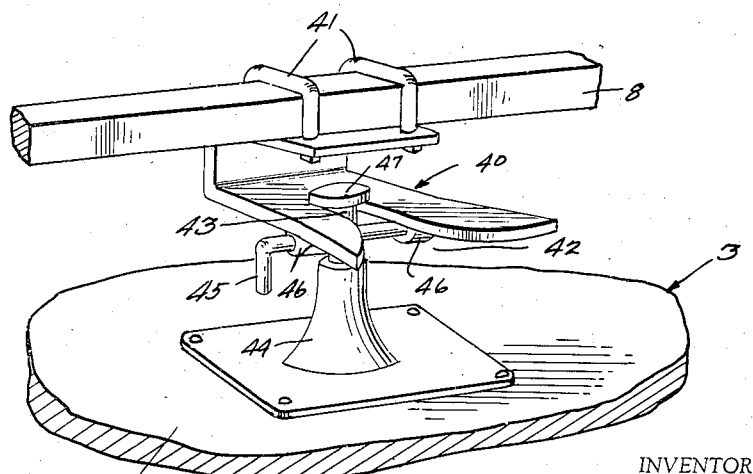
Fig. 8 is another modification in which the pivot pin is positioned on the floor of a railroad car.

Referring to Fig. 8, the axle 8 is secured to the bracket 40 by means of the U bolts 41 and the forward edge of the bracket 40 is bifurcated at 42 to receive the pin 43 carried by the standard 44, the same being suitably secured to the floor of a railroad car. A locking pin 45 extends through the lugs 46 positioned on the lower face of the bracket 40 and locks the bracket to the pivot pin 43. Since the pin 43 is provided with the enlarged head 47 which is of sufficient diameter to span the bifurcation 42 the bracket 40 and the axle 8 will be held down against vertical movement when positioned on the railroad car.

It is to be understood that although a trailer has been shown in the drawings that, nevertheless, any wheeled vehicle may be positioned on the railroad car without departing from the spirit of the invention and the scope of the appended claims and further that although two trailers are shown as being positioned on the railroad car that nevertheless any number may be loaded depending upon the length of each trailer and the length of the railroad car on which they are to be positioned.

It is also to be understood that although the trailer is shown as being provided with an offset that this is merely one form of trailer construction that may be used and various other types may be loaded with equal facility.

It will thus be seen that a railroad car may be quickly and easily loaded with one or more trailers from a point adjacent the side of the car and practically the entire length of the car may be utilized by the trailers.

From the foregoing description it becomes evident that I have provided a system for loading trailers on railroad cars which will permit extremely rapid loading or unloading of the trailers on or from the cars and which will permit a truck or tractor to be hooked onto the forward end of one of the trailers so that the trailer may be driven directly from the cars to any desired point.

Having thus fully described my invention, its utility and mode of operation, what I claim and desire to secure by Letters Patent of the United States is—

1. In combination, a railroad car and a trailer carried thereby, a standard on the car provided with a notch, road wheels on the trailer, an axle for the wheels secured to the bottom of the trailer and positioned adjacent the rear end thereof, a pivot pin on the axle for engaging the notch in the standard whereby the wheels on the trailer are caused to traverse an arc about the pivot pin as the front end of the trailer is moved, to position the trailer longitudinally of the railroad car.

2. In combination, a railroad car and a trailer carried thereby, a standard on the car provided with a notch, road wheels on the trailer, an axle for the wheels secured to the bottom of the trailer and positioned adjacent the rear end thereof, a pin on the axle for engaging the notch in the standard, whereby the wheels on the trailer are caused to traverse an arc about the pivot pin as the front end of the trailer is moved to position the trailer longitudinally of the front end of the car, and supporting wheels positioned adjacent the front end of the trailer for carrying the weight of the forward end thereof as the trailer is moved onto or from the railroad car, the supporting wheels being arranged to rotate in a plane parallel to the direction of movement of the said wheels.

3. In combination, a railroad car having a floor, a trailer carried thereby, and a tractor adapted for detachably and pivotally securing one end of the trailer thereto, a standard on the car, road wheels on the trailer positioned adjacent the rear end thereof and supporting the same, means centrally disposed between said road wheels at the rear end of the trailer for engaging the standard to thereby pivotally connect the trailer to the standard on the car whereby the wheels on the trailer are caused to traverse the car floor on a predetermined arc as the front end of the trailer is moved by movement of the tractor, to position the trailer longitudinally of the railroad car, a rod detachably secured at one end to the front end of the trailer and the other end to the tractor whereby movement of the tractor in one direction will swing the forward end of the trailer onto the railroad car and reverse movement of the tractor will move the forward end of the trailer from the car.

4. In combination, a railroad car having a uniform flat surface from end to end providing a load carrying platform, and a trailer to be carried thereby, road wheels on the trailer positioned adjacent one end thereof, wheels at the forward end for supporting the same, a standard extending upwardly from the car platform adjacent one end thereof, and means at the rear end of the trailer centrally disposed thereof for engaging the standard, the standard and the companion means on the car providing the sole pivotal connection between the wheeled end of the trailer and the car whereby the wheels of the trailer are caused to move in an arc on the car platform as the front end of the trailer is moved to position the same longitudinally of the railroad car.

5. In combination, a railroad car having a uniform flat surface from end to end providing a load carrying platform, and a trailer to be carried thereon, road wheels on the trailer posiioned adjacent one end thereof, a member adjacent each end of the car platform, a companion member on the wheeled end of the trailer engageable with either of the said members on the car providing the sole pivotal connection between the wheeled end of the trailer and one or the other of the members on the car when in engagement whereby the wheels of the trailer are caused to move in an arc on the car platform as the front end of the trailer is moved to position the same longitudinally of the railroad car.

LYNN M. FRANCIS.